United States Patent
Workman et al.

(10) Patent No.: US 10,160,168 B2
(45) Date of Patent: Dec. 25, 2018

(54) CUTTING MATS AND METHODS OF MAKING SAME

(71) Applicant: Day International, Inc., Plymouth, MI (US)

(72) Inventors: Robert R. Workman, Asheville, NC (US); Andrew G. Miller, Hendersonville, NC (US); James C. Rogers, Arden, NC (US)

(73) Assignee: DAY INERNATIONAL INC., Plymouth, MI (US)

( * ) Notice: Subject to any disclaimer, the term of this patent is extended or adjusted under 35 U.S.C. 154(b) by 107 days.

(21) Appl. No.: 15/273,031

(22) Filed: Sep. 22, 2016

(65) Prior Publication Data
US 2017/0080645 A1    Mar. 23, 2017

Related U.S. Application Data (60) Provisional application No. 62/222,487, filed on Sep. 23, 2015.

(51) Int. Cl.
  *B29C 70/32* (2006.01)
  *B29C 35/08* (2006.01)
  (Continued)

(52) U.S. Cl.
  CPC .............. *B29C 70/32* (2013.01); *B26D 7/204* (2013.01); *B29C 35/0805* (2013.01); *B32B 5/02* (2013.01);
  (Continued)

(58) Field of Classification Search
  CPC ............ B26D 7/204; B29C 2035/0827; B29C 35/0805; B29C 70/32; B29K 2995/0082;
  (Continued)

(56) References Cited

U.S. PATENT DOCUMENTS

| 4,784,285 A | 11/1988 | Patel |
| 5,004,201 A | 4/1991 | Bessinger |

(Continued)

FOREIGN PATENT DOCUMENTS

| CN | 204659035 U | 9/2015 |
| CN | 204659036 U | 9/2015 |

(Continued)

OTHER PUBLICATIONS

International Search Report pertaining to PCT/US2016/053027, filed Sep. 22, 2016, 6 pages.

(Continued)

*Primary Examiner* — Camie S Thompson
(74) *Attorney, Agent, or Firm* — Dinsmore & Shohl LLP (57) ABSTRACT

In various embodiments, a method of making a cutting mat backing includes creating a roving by wrapping a fiber material around a rotary cylinder under tension to form a plurality of layers. Each of the plurality of layers is angled with respect to a central axis of the rotary cylinder and the roving has a normalized axial flexural rigidity of from 2 lbf.in$^2$ to 30 lbf.in$^2$ over a beam width of 1 inch and a ratio of normalized circumferential flexural rigidity to normalized axial flexural rigidity of from 1:1 to 30:1. The method further includes infusing the roving with a polymer resin and curing the resin via electromagnetic radiation to form the cutting mat backing. Cutting mats including the cutting mat backing are also described.

19 Claims, 3 Drawing Sheets

(51) Int. Cl.
*B32B 27/40* (2006.01)
*B32B 27/08* (2006.01)
*B32B 5/02* (2006.01)
*B26D 7/20* (2006.01)
B29K 75/00 (2006.01)
B29K 309/08 (2006.01)
B29K 307/04 (2006.01)
B29L 9/00 (2006.01)

(52) U.S. Cl.
CPC .............. *B32B 27/08* (2013.01); *B32B 27/40* (2013.01); *B29C 2035/0827* (2013.01); *B29K 2075/00* (2013.01); *B29K 2307/04* (2013.01); *B29K 2309/08* (2013.01); *B29K 2995/0082* (2013.01); *B29L 2009/00* (2013.01); *B32B 2262/101* (2013.01); *B32B 2262/106* (2013.01); *B32B 2307/546* (2013.01)

(58) Field of Classification Search
CPC ............ B29K 2075/00; B29K 2307/04; B29K 2309/08; B29L 2009/00; B32B 2262/101; B32B 2262/106; B32B 2307/546; B32B 27/40; B32B 27/08; Y10T 29/4956; Y10T 83/4841; Y10T 83/9312; Y10T 83/9466
USPC .............................................. 492/48; 83/659
See application file for complete search history.

(56) References Cited

U.S. PATENT DOCUMENTS

| | | | |
|---|---|---|---|
| 5,720,212 A | 2/1998 | Kirkpatrick | |
| 5,758,560 A | 6/1998 | Fiscus | |
| 5,906,149 A | 5/1999 | Montenegro Criado | |
| 5,916,346 A | 6/1999 | Neal | |
| 6,116,135 A | 9/2000 | Wagner | |
| 6,135,002 A | 10/2000 | Neal | |
| 6,435,069 B1 * | 8/2002 | Kirkpatrick, Jr. | B26D 7/20 264/311 |
| 6,609,997 B1 | 8/2003 | Sardella et al. | |
| 6,612,214 B2 | 9/2003 | Neal | |
| 6,629,482 B2 | 10/2003 | Elia et al. | |
| 6,668,694 B2 | 12/2003 | Neal et al. | |
| 6,698,326 B2 | 3/2004 | Elia et al. | |
| 6,722,246 B2 | 4/2004 | Porcella | |
| 6,785,963 B2 | 9/2004 | Kirkpatrick, Jr. et al. | |
| 6,889,587 B2 | 5/2005 | Neal | |
| 7,007,531 B2 | 3/2006 | Donhauser et al. | |
| 7,476,191 B2 | 1/2009 | Putch et al. | |
| 8,353,235 B2 | 1/2013 | Bengoa Rodriguez | |
| 8,590,436 B2 | 11/2013 | Elia et al. | |
| 2002/0189749 A1 | 12/2002 | Shieh | |
| 2003/0041714 A1 | 3/2003 | Neal et al. | |
| 2006/0191390 A1 | 8/2006 | Neal | |
| 2011/0036217 A1 | 2/2011 | Schneider | |

FOREIGN PATENT DOCUMENTS

| | | |
|---|---|---|
| DE | 10213379 A1 | 10/2003 |
| DE | 202011108690 U1 | 3/2012 |
| EP | 0 900 637 A2 | 10/1999 |
| EP | 1327520 A1 | 7/2003 |
| EP | 1084013 B1 | 11/2003 |
| EP | 2073964 B1 | 5/2014 |
| GB | 2 356 594 A | 5/2001 |
| TW | M506136 U | 8/2015 |
| TW | M506137 U | 8/2015 |
| WO | 9955501 A1 | 11/1999 |
| WO | 2015175626 A1 | 11/2015 |
| WO | 2016032483 A1 | 3/2016 |

OTHER PUBLICATIONS

Written Opinion pertaining to PCT/US2016/053027, filed Sep. 22, 2016, 5 pages.

"Dicar—New A2R Anvil Covers" http://www.dicar.com, 2012.

* cited by examiner

CUTTING MATS AND METHODS OF MAKING SAME

CROSS-REFERENCE TO RELATED APPLICATIONS

This patent application claims priority to U.S. Provisional Patent Application Ser. No. 62/222,487, filed Sep. 23, 2015, and entitled "Rigid Cutting Mats and Methods of Making Same," which is hereby incorporated by reference in its entirety.

TECHNICAL FIELD

The subject matter described herein relates to cutting mats, and more particularly, to cutting mats adapted to be mounted onto rotary anvils and including a resin-infused roving backing.

BACKGROUND

Rotary die cutting machines are used to perform cutting and scoring operations in numerous industries including in the manufacture of corrugated products such as boxes and shipping containers. Generally, the rotary die cutting machines pass a continuously moving workpiece through the nip of a cutting die and a rotary anvil. The cutting die includes blades that project from the surface thereof to provide desired cutting and scoring actions to the workpiece. The rotary anvil supports the workpiece and includes thereon one or more resilient cutting mats which are aligned around the circumference of the anvil. The cutting mats are typically formed from a resilient polymeric material. The cutting mats serve as a backstop allowing the cutting die blades to be urged against the workpiece without damaging the blades themselves or the surface of the anvil. However, being subjected to repeated contact with the die cutting blades causes surface wear and tear on the mats and requires that the mats be frequently changed out or replaced.

Cutting mats are typically manufactured to include a backing or support layer beneath the resilient polymer to provide stiffness and aid in mounting the mats onto rotary anvil cylinders. Generally, the use of such backing materials has led to problems such as increased weight, lack of flexibility which complicates installation, and the inability of the backing material to hold and maintain a uniform, flat surface across the width of cutting mat. This inability to hold and maintain a uniform, flat surface is often referred to as "cupping." Cupping may be defined as the width of a gap which forms between the backing material of the cutting mat and the surface of the rotary anvil cylinder when the mat is installed. These gaps cause the upper working surface of the mat to have high spots such that the surface is not planar. The use of a steel backing layer has this cupping problem.

With the development of new technologies available in corrugate manufacturing, the functionality of cutting mats is changing. In the past, cutting mats could be rotated or moved to different positions on an anvil cylinder to extend their useful lives. Cupping, while a nuisance, was largely ignored. Current rotary die cutting equipment, however, is equipped with the ability to grind or dress the working surface of a cutting mat. The ability to resurface the cutting mat during operation has increased the useful life of a mat, while rendering obsolete the need to rotate or move the mats. This improvement in equipment has made the need to reduce or eliminate cupping of the cutting mats a greater priority.

With the use of abrading or grinding cylinders in rotary die cutting equipment, those portions of the surfaces of the mats, which are raised across the width of the mats due to cupping is removed. However, the gap that exists between the anvil cylinder and cutting mat backing remains. During operation of the rotary die cutting equipment, pressures applied by both the rotary cutting dies and corrugate as it is being cut or scored pushes downwardly on the mat surface and reduces the gap. This "closing" or reduction of the gap in turn results in what has been referred to as low spots on the surfaces of the cutting mats. These low spots result in imperfections or voids in the finished corrugated product, because the cutting or scoring process is incomplete. These imperfections result in increased scrap corrugate, and may cause the end user to reject the cutting mats as defective.

Accordingly, there remains a need in the art to reduce or eliminate cupping of cutting mats used in rotary die cutting equipment.

SUMMARY

The embodiments of the present disclosure address the cupping problem by incorporating a composite cutting mat backing formed from a fiber material and cured resin, which is lighter than conventional steel backings, yet provides greater rigidity to conform the cutting mat to the surfaces of rotary anvil cylinders. Cutting mats that utilize the rigid composite of the embodiments of the present disclosure maintain a flat, uniform surface across the width of the cutting mats. Cupping and resultant low spots are greatly reduced or eliminated.

In accordance with one embodiment, a method of making a cutting mat backing for use with a rotary anvil is provided. The method includes creating a roving by wrapping a fiber material around a rotary cylinder under tension to form a plurality of layers. Each of the plurality of layers is angled with respect to a central axis of the rotary cylinder. The roving has a normalized axial flexural rigidity of from 2 to 30 $lbf.in^2$ over a beam width of 1 inch and a ratio of normalized circumferential flexural rigidity to normalized axial flexural rigidity of from 1:1 to 30:1. The method further includes infusing the roving with a polymer resin and curing the resin via electromagnetic radiation to form the cutting mat backing.

In accordance with another embodiment, a method of making a cutting mat backing includes creating a roving by wrapping a plurality of fiberglass strands around a rotary cylinder under tension to form a plurality of layers. Each of the plurality of layers is angled with respect to a central axis of the rotary cylinder. The roving has a normalized axial flexural rigidity of from 2 to 30 $lbf.in^2$ over a beam width of 1 inch and a ratio of normalized circumferential flexural rigidity to normalized axial flexural rigidity of from 1:1 to 30:1. The method further includes infusing the roving with a polyurethane resin and curing the resin using ultraviolet light to form the cutting mat backing.

In accordance with yet another embodiment, a cutting mat includes a cutting mat backing including a roving that includes a plurality of layers infused with a polymer resin. Each of the plurality of layers includes wrapped fiber material. The roving has a normalized axial flexural rigidity of from 2 to 30 $lbf.in^2$ over a beam width of 1 inch and a ratio of normalized circumferential flexural rigidity to normalized axial flexural rigidity of from 1:1 to 30:1 before being infused with the polymer resin. The cutting mat further includes a cutting surface coupled to the cutting mat backing.

Other features and advantages of the present disclosure will be apparent from the following detailed description, the accompanying drawings, and the appended claims.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
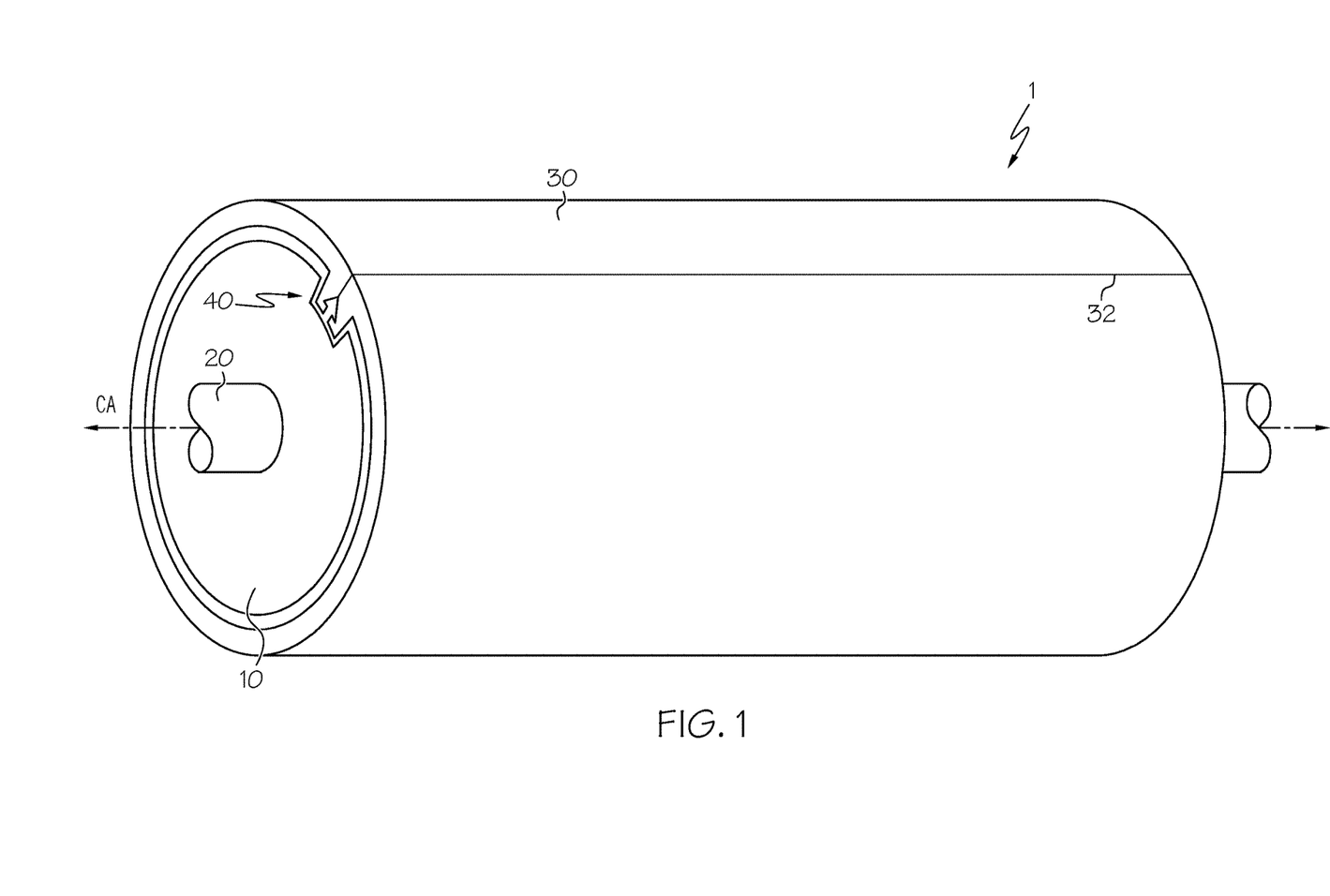
FIG. 1 is a schematic depiction of a rotary anvil according to one or more embodiments.
Figure 2:
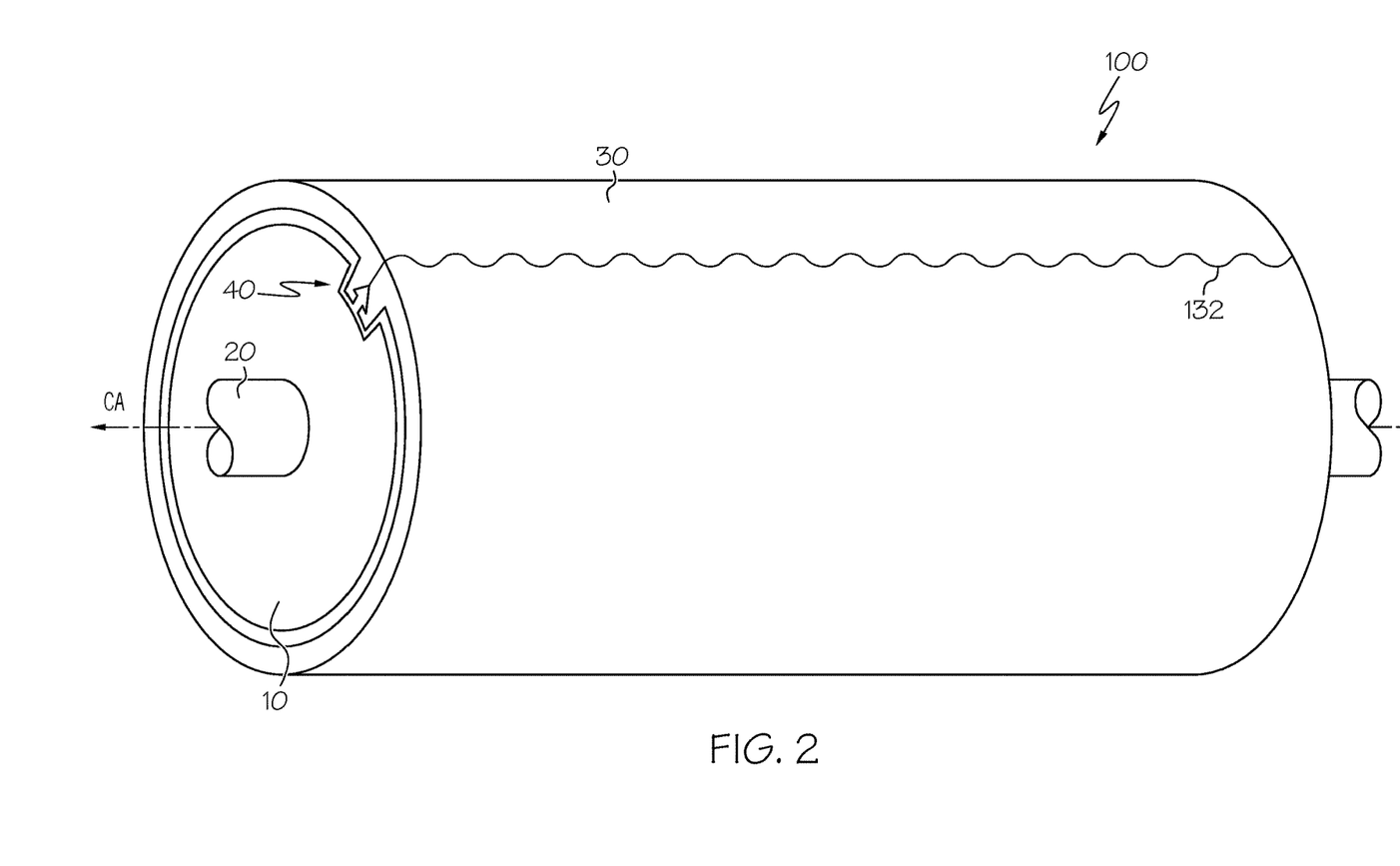
FIG. 2 is a schematic depiction of an alternative rotary anvil according to one or more embodiments.

Embodiments are directed to cutting mats for rotary anvils, which are made of composite having greater stiffness and rigidity than steel. Referring initially to FIGS. 1 and 2, a rotary anvil 1 is depicted. The rotary anvil 1 may be utilized in corrugate cutting systems or in other industrial applications. As shown in FIGS. 1 and 2, the rotary anvil 1 includes a cylindrical body 10 coaxially disposed on a shaft member 20. The rotary anvil 1 also includes a cutting mat 30 coaxially wrapped around at least a portion of the cylindrical body 10. As depicted in FIGS. 1 and 2, the cutting mat 30 may act as a sleeve on a portion of the cylindrical body 10. The cylindrical body 10 may be formed from a metallic composition, for example, steel.

Figure 3:
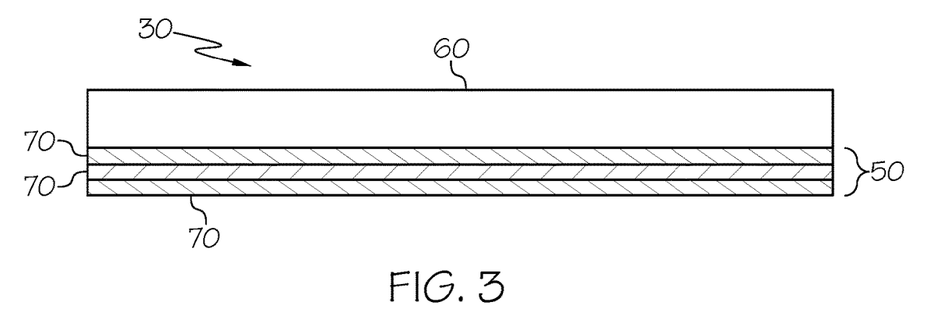
FIG. 3 is a schematic depiction of a cross section of a cutting mat according to one or more embodiments.

In general, as depicted in FIG. 3, the cutting mat 30 includes a cutting mat backing (sometimes referred to herein as a "backing") 50 and a cutting surface 60. In various embodiments, the cutting mat backing 50 is a composite structure including a fiber material and cured polymer resin.

The fiber material may include carbon fibers, glass fibers, aramid fibers, nylon fibers, polyester fibers, or combinations thereof. In one particular embodiment, the fiber material is glass fiber. Glass fibers may be made of various types of glass depending upon the particular fiberglass, but generally contain silica or silicate, with varying amounts of oxides of calcium, magnesium, and sometimes boron. In some embodiments, the fiber is made of strands that are between 11 μm and 13 μm. The fiber material may be wound around the cylinder at a density of 2,400 grams per square meter.

The fiber material may have any one of a number of suitable structures. For example and not by way of limitation, the fiber material may be in the form random mats, scrims, chopped fibers, knits, plies, filaments, three-dimensional weaves and preforms, non-woven or woven fabrics, or combinations thereof. In one embodiment, the fiber material may include filaments, fibers or strands wound under tension, referred to herein as "tension wound filaments". For example, the filaments may be wound or wrapped around the cylindrical body 10 under tension. The filaments may be wound around a cylindrical body 10 used in a rotary anvil 1 incorporated into a corrugate die cutting system, or may be wrapped under tension on any cylindrical body having the same dimensions of a rotary anvil in which the cutting mat 30 will be subsequently incorporated. In embodiments, one or more layers 70 are formed by winding 24 strands of 670 weight glass fiber over a width of approximately 4.0 inches around the cylindrical body 10 under tension.

Figure 4A:
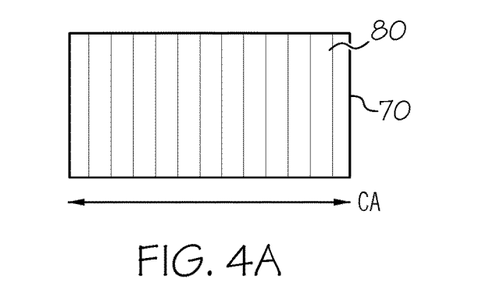
FIG. 4A schematically depicts an arrangement of a plurality of tension wound filaments forming a non-angled layer according to one or more embodiments.
Figure 4B:
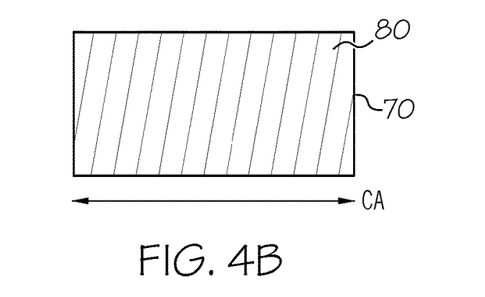
FIG. 4B schematically depicts an arrangement of a plurality of tension wound filaments forming an angled layer according to one or more embodiments.
Figure 4C:
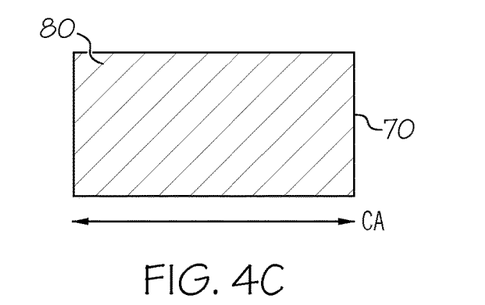
FIG. 4C schematically depicts an alternative arrangement of a plurality of tension wound filaments forming another angled layer according to one or more embodiments.

In various embodiments, one or more layers 70 of the tension wound filaments may be applied on the cylindrical body 10 in various patterns or arrangements. For example, at least one of the layers 70 of the tension wound filaments may be applied at an angle. As used herein, "layer" refers to a plurality of filaments wrapped side by side at the same angle on the cylindrical body. For example, it is contemplated to wrap a first layer without an angle (i.e., a non-angled layer parallel to a plane defined by the ends of the cylindrical body or perpendicular to a central axis CA of the cylindrical body 10). FIG. 4A schematically depicts a plurality of tension wound filaments 80 wrapped perpendicularly to the central axis CA to form a layer without an angle. Alternatively, the first layer may be applied at an angle. In embodiments, one or more layers of the fiber material are angled at an angle of from 80° to 89°, or from 84° to 86°, with respect to a central axis CA of the cylindrical body 10. FIG. 4B schematically depicts a plurality of tension wound filaments 80 wrapped at an angle of from 80° to 89° relative to the central axis CA to form a layer with an angle of 80° to 89°. In embodiments, one or more layers of the fiber material may be angled at an angle of from 45° to 54° with respect to a central axis CA of the cylindrical body 10. FIG. 4C schematically depicts a plurality of tension wound filaments 80 wrapped at an angle of from 45° to 54° relative to the central axis CA to form a layer with an angle of 45° to 54°. It is contemplated that a layer having an angle may include at least some tension wound filaments 80 oriented parallel to the plane defined by the ends of the cylindrical body (i.e., perpendicular to the central axis CA) or otherwise deviate slightly from the angle of the layer.

Moreover, it is contemplated that second and any subsequent layers may be wrapped at an angle such that it overlaps or crosses the first layer and/or any intervening layers. Without being bound by theory, the thickness and/or the stiffness of the composite may be adjusted by increasing or decreasing the number of layers of fiber material.

For example, in one embodiment, first and second layers of fiber material may be wrapped around the rotary cylinder under tension at an angle of 45° to 54° with respect to a central axis CA of the cylindrical body 10, third and fourth layers of the fiber material be wrapped around the rotary cylinder under tension at an angle of 80° to 89° with respect to a central axis CA of the cylindrical body 10, and fifth and sixth layers of the fiber material may be wrapped around the rotary cylinder under tension at an angle of 45° to 54° with respect to a central axis CA of the cylindrical body 10. As another example, first and second layers of fiber material may be wrapped around the rotary cylinder under tension at an angle of 80° to 89° with respect to a central axis CA of the cylindrical body 10, and third and fourth layers of the fiber material be wrapped around the rotary cylinder under tension at an angle of 45° to 54° with respect to a central axis CA of the cylindrical body 10. As yet another example, a first layer of fiber material may be wrapped around the rotary cylinder under tension at an angle of 45° to 54° with respect to a central axis CA of the cylindrical body 10, a second layer of the fiber material be wrapped around the rotary cylinder under tension at an angle of 80° to 89° with respect to a central axis CA of the cylindrical body 10, and a third layer of the fiber material may be wrapped around the rotary cylinder under tension at an angle of 45° to 54° with respect to a central axis CA of the cylindrical body 10. Thus, it is contemplated that the layers may be wrapped around the cylindrical body 10 in a variety of orientations, some having at least two adjacent layers wrapped at the same angle and some having varying angles between adjacent layers.

In various embodiments, when wound under tension around the cylindrical body 10, the layers 70 of fiber material form a roving that has a rigidity greater than that of conventional cutting mat backing layers. As used herein, "rigidity" corresponds to the flexural stiffness of a beam. Without being bound by theory, since the flexural stiffness (defined by EI) of a beam is proportional to the area moment of inertia (I) which has the beam width (b) in its numerator, then the flexural stiffness is directly proportional to the beam width. Flexural stiffness (EI) may also be referred to herein as flexural stiffness or flexural rigidity. In various embodiments, EI values are adjusted (or "normalized") to compensate for varying beam widths. As used herein, "normalized flexural rigidity" means EI values normalized to the value corresponding to a 1.0 inch beam width. The normalized flexural rigidity may also be referred to herein as flexural rigidity per inch width.

In embodiments, the rigidity of the roving may be defined by a flexural rigidity per inch width in a circumferential direction (e.g., around the cylindrical body 10) of from about 2 lbf.in$^2$ to about 50 lbf.in$^2$. In further embodiments, the roving has a flexural rigidity per inch width in the circumferential direction of from about 10 lbf.in$^2$ to about 40 lbf.in$^2$, or from about 20 lbf.in$^2$ to about 30 lbf.in$^2$. Without being bound by theory, the rigidity as defined by the flexural rigidity per inch width in the circumferential direction helps to ensure that the composite cutting mat remains flat. Due to the cutting process, surface irregularities (i.e., "high spots" or "low spots"), which deviate from the desired flat structure, make it difficult to attach the cutting mat to the cylindrical body. The rigidity of the present cutting mat embodiments greatly reduces the likelihood of these surface irregularities.

Moreover, in various embodiments, the roving has a normalized axial flexural rigidity of greater than one lbf.in$^2$. In embodiments, the roving has a normalized axial flexural rigidity of from about 2 lbf.in$^2$ to about 30 lbf.in$^2$, from about 2.5 lbf.in$^2$ to about 15 lbf.in$^2$, or from about 2.5 lbf.in$^2$ to about 5.5 lbf.in$^2$. Without being bound by theory, rigidity in the axial direction ensures that the axial edges of the cutting mat 30 remain straight, thereby ensuring the axial edges properly interlock to form a seam 32 or 132 as depicted in FIGS. 1 and 2, respectively.

In various embodiments, the roving has a ratio of normalized circumferential flexural rigidity to normalized axial flexural rigidity of from 1:1 to 30:1. In some embodiments, the roving has a ratio of normalized circumferential flexural rigidity to normalized axial flexural rigidity of from 1:1 to 20:1, from 1:1 to 10:1, from 1:1 to 8:1, or even from 1:1 to 7.5:1. According to various embodiments, the normalized circumferential flexural rigidity of the roving is greater than the normalized axial flexural rigidity. For example, in some embodiments, the roving has a difference between the normalized circumferential flexural rigidity and the normalized axial flexural rigidity of from about 1 lbf.in$^2$ to about 21 lbf.in$^2$.

In various embodiments, the fiber material used in the production of the cutting mat 30 may be coated, impregnated, and/or infused with the polymer resin, and then subsequently cured. The polymer resin may be any suitable type of thermosetting plastic or thermoplastic. In various embodiments, the polymer resin material may include, by way of example and not limitation, epoxy, polyurethane, polyamide, polyacrylate, polyester, styrene resin or combinations thereof. In one embodiment, the polymer resin comprises polyurethane. In other embodiments, the polymer resin may include a blend of unsaturated polyester and styrene resins. The polymer resin may be those commercially available from Ashland Chemical, BASF, Bayer, BUFA, and Lyondell Basil.

In some embodiments, additives, such as curing agents and crosslinking agents, may be included with the polymer resin. Curing agents may include, by way of example and not limitation, methyl ethyl ketone peroxide (MEKP), acetyl acetone peroxide. Crosslinking agents may include, for example, cobalt octoate, which may be used to as a drier and cross-linker. Coloring agents may further be added to resins with transparent dyes or opaque pigments. Additionally or alternatively, styrene may be added to thin resins and enhance handling properties.

In embodiments, the fiber may be coated with the polymer resin prior to wrapping or during wrapping the fiber around the cylindrical body 10, or may even be coated with the polymer resin post-wrapping. In one embodiment, the polymer resin may be applied on the fiber material post-wrapping by a hand lamination. Alternatively, the polymer resin may be applied on the fiber material prior to wrapping by dipping the fiber material in a resin bath and then wrapping the dipped fiber material around the cylindrical body 10 under tension. Additional methods for applying the polymer resin are considered suitable, for example, spraying the polymer resin on the fiber material.

The cutting mat backing 50 is formed by curing the fiber material coated with polymer resin while wrapped around a cylindrical body under tension. Various curing mechanisms are contemplated. In various embodiments, the polymer resin is cured via electromagnetic radiation. For example, the polymer resin may be UV cured, microwave cured, or cured using a heat source, such as an oven, autoclave or the like.

Without being limited to procedure, in some embodiments, the curing procedure involves curing the composite on the cylindrical body 10 for up to 2 hours at temperature from about 100° C. to about 150° C. In some embodiments, the composite may undergo an additional curing step (also called post-cure) in which the composite is heated for about 6 to about 10 hours at temperatures from about 200° C. to about 250° C., of which the first 30-60 minutes may represent temperature ramp-up time.

After curing, the final composition of the composite forming the cutting mat backing 50 may include from about 10 wt % to about 50 wt % of polymer resin, and from about 50 wt % to about 90 wt % of fiber material. In some embodiments, the composite may include from about 20 wt % to about 40 wt % of polymer resin, and from about 60 wt % to about 80 wt % of fiber material.

In various embodiments, the composite has a thickness of about 0.02 inches to about 0.12 inches. In further embodiments, the composite may have a thickness of about 0.03 inches to about 0.10 inches, or a thickness of about 0.05 inches to about 0.09 inches. Moreover, the composite may have a Shore A hardness of about 70 to about 100, about 70 to about 95, about 90 to about 97, or about 80 to about 90, depending on the particular embodiment.

The cutting mat backing 50 in various embodiments may be defined by a flexural rigidity per inch width in a circumferential direction (e.g., around the cylindrical body 10) of from about 30 lbf.in² to about 150 lbf.in². In further embodiments, the flexural rigidity per inch width in the circumferential direction is about from about 35 lbf.in² to about 100 lbf.in², or from about 37 lbf.in² to about 65 lbf.in². The cutting mat backing 50 in various embodiments may further be defined by a flexural rigidity per inch width in an axial direction (e.g., across the cylindrical body 10) of from about 30 lbf.in² to about 150 lbf.in². In further embodiments, the flexural rigidity per inch width in the axial direction is about from about 40 lbf.in² to about 100 lbf.in², or from about 45 lbf.in² to about 80 lbf.in².

While the discussion of the cutting mat 30 herein focuses on the composite material which forms the cutting mat backing 50, other components of the cutting mat 30 and anvil cylinder may also be captured within the embodiments of the present disclosure. For example, various cutting surfaces 60 are contemplated which may be coupled to the cutting mat backing 50 to form the cutting mat 30. In general, the cutting surface 60 may face the direction of an object being cut, such as cardboard, and come into contact with the object and the blades to absorb the force exerted by the blades. The cutting surface 60 may be made of any suitable material, including, but not limited to, urethane, epoxy resins, polyamides, polyacrylates, polyesters, urea-formaldehyde resins, melamine resins, styrene resins (unsaturated polyester styrene resins), or combinations thereof. In various embodiments, the final cutting mat has a Shore A hardness of about 80 to about 95, about 82 to about 92, about 82 to about 87, or about 89 to about 92, depending on the particular embodiment.

In embodiments, the cutting surface 60 may be coupled to the cutting mat backing 50 by applying a layer of urethane or other material making up the cutting surface 60 as a resin to the cutting mat backing 50 and curing the resin. In some embodiments, the cutting mat backing 50 may be placed in a mold and the urethane or other resin to form the cutting surface 60 may be poured into the mold and then cured. Alternatively, the cutting surface 60 may be bonded in other ways to the cutting mat backing 50, such as through the use of an adhesive.

As another example, various locking mechanisms for the cutting mats 30 are contemplated. These locking mechanisms may include but are not limited to the Diamond Loc or ClamLoc™ locking mechanisms utilized in the dayCorr cutting mats produced by Flint Group (Arden, N.C.). A schematic depiction of the Diamond Loc locking mechanism 40 is provided in FIGS. 1 and 2. Additional details about these locking mechanisms are provided in U.S. Pat. Nos. 5,720,212, 5,758,560, 5,916,346, 6,629,482, 6,698,326, 6,722,246, 7,007,581, and 8,590,436, and U.S. Patent Application Publication No. 2006/0191390, each of which is incorporated by reference herein in its entirety.

Moreover, the cutting mat 30 depicted in FIGS. 1 and 2 is a single sheet wrapped around the cylindrical body 10 with opposite axial edges meeting to form seam 32. The seam 32 of FIG. 1 is a straight seam; however, the alternative seam 132 depicted in FIG. 2 is a serpentine seam formed by serpentine axial edges which has been shown to improve cutting mat life. Additional details regarding cutting mat axial edges and seams are provided in U.S. Pat. No. 8,590,436, which is incorporated by reference herein in its entirety.

In addition to reducing "high spots" or "low spots", as discussed above, the rigidity of the present cutting mats may also reduce the "curling" effect. In the installation of the cutting mats on the cylindrical body, it is desirable that they have a curvature that conforms or contours to the cylindrical body. However, conventional cutting mats have a tendency to "curl" or open up, such that the curvature of the cutting mat does not contour as well to the cylindrical body. In contrast, the cutting mats according to various embodiments described herein have demonstrated resistance to this curling effect and maintain its curvature, thereby ensuring good conformity to the cylindrical body and easy installation of the cutting mat.

Testing Methods

The flexural rigidity values may be calculated using an Instron unit, for example, an Instron 5568 unit, in accordance with ASTM D790. The test is a beam deflection test where the ends are simply supported (no restraints) and a load is gradually applied at the mid span of the sample. The Instron records load vs. deflection. The equation for the deflection is as follows:

$$\text{Deflection} = \frac{(P \times L^3)}{(48 \times EI)}$$

where P is the applied deflection load, L is the length between supports, and EI is the flexural rigidity per inch width (also called flexural stiffness factor or bending modulus).

EXAMPLES

The various embodiments described above will be further clarified by the following example.

Three samples were prepared from each of a number of various cutting mat backing structures. The samples were cut from sleeves that were manufactured on a 20.337" diameter mandrel. The samples were 1 foot in length. Comparative Example 1 was a 0.024 inch thick perforated steel backing blank having a hole diameter of 0.125" and 40% open area. Comparative Example 2 was a 0.019 inch thick solid steel backing blank made of low carbon cold rolled steel. Comparative Example 3 was a fiber mesh backing blank having 0.030 inch by 0.070 inch rectangular openings and 144 openings per square inch of material.

Example 1 was a roving prepared by winding woven carbon fiber (CF) material onto a cylinder under tension, each layer was applied at an angle such that the edges of preceding and following wraps abutted each other. The roving included two layers of 84 gram per square meter CF, two layers of 290 gram per square meter CF and two additional layers of 84 gram per square meter CF. The layers were hand laminated and cured in both lay down and stand up ovens. The resulting roving was 0.077 inches thick.

Example 2 was a roving prepared by a filament winding process using a series of 24 glass fiber strands spaced over a width of 4 inches onto a cylinder under tension. The roving included two layers at 54 degrees relative to the central axis of the cylinder, followed by four additional layers wound at 85 degrees relative to the central axis of the cylinder. The layers were UV cured. The resulting roving was 0.056 inches thick.

Example 3 was a roving prepared by winding woven glass fiber (GF) material onto a cylinder under tension. Each layer was applied at an angle such that the edges of preceding and following wraps abutted each other. The roving included two layers of 84 gram per square meter of GF, two layers of 290 gram per square meter of GF and two additional layers of 84 gram per square meter of GF. The layers were hand laminated and cured in a lay down oven. The resulting roving was 0.056 inches thick.

Example 4 was a roving prepared by winding woven glass fiber (GF) material onto a cylinder under tension. Each layer was applied at an angle such that the edges of preceding and following wraps abutted each other. The roving included two layers of 84 gram per square meter of GF, two layers of 290 gram per square meter of GF and two additional layers of 84 gram per square meter of GF. The layers were hand laminated and cured in both lay down and stand up ovens. The resulting roving was 0.050 inches thick.

Example 5 was a roving prepared by a filament winding process using a series of 24 glass fiber strands spaced over a width of 4 inches onto a cylinder under tension. The roving included two layers at 85 degrees relative to the central axis of the cylinder, followed by four additional layers wound at 54 degrees relative to the central axis of the cylinder. The layers were UV cured. The resulting roving was 0.052 inches thick.

Flexural rigidity for each of the samples was taken in the circumferential direction and averaged for each comparative example and example. Additionally, flexural rigidity for each of the samples was taken in the axial direction and averaged for each of the examples and Comparative Example 3. Values were normalized to produce a flexural rigidity per inch width. The results are reported in Table 1.

Axial measurements were not taken for Comparative Examples 1 and 2, since with was assumed that perforated and solid steel backings would result in nearly identical values in both the circumferential and axial directions. Thus, for Comparative Examples 1 and 2, the ratio of circumferential to axial rigidity is assumed to be 1.00.

TABLE 1

Flexural Rigidity in Circumferential and Axial Directions

| | EI (Circ. Direction) | EI (Axial Direction) | Ratio (Circ./Axial) |
|---|---|---|---|
| Comparative Example 1 | 22.9 lbf · in$^2$ | n/a | 1.00* |
| Comparative Example 2 | 17.1 lbf · in$^2$ | n/a | 1.00* |
| Comparative Example 3 | 0.26 lbf · in$^2$ | 0.62 lbf · in$^2$ | 0.42 |
| Example 1 | 27.85 lbf · in$^2$ | 26.01 lbf · in$^2$ | 1.07 |
| Example 2 | 25.51 lbf · in$^2$ | 5.51 lbf · in$^2$ | 4.72 |
| Example 3 | 23.54 lbf · in$^2$ | 12.05 lbf · in$^2$ | 1.95 |
| Example 4 | 21.21 lbf · in$^2$ | 11.73 lbf · in$^2$ | 1.81 |
| Example 5 | 20.89 lbf · in$^2$ | 2.87 lbf · in$^2$ | 7.27 |

*Assumed value

As shown, the roving samples prepared in accordance with various embodiments, yielded an average circumferential flexural rigidity value between 20 lbf.in$^2$ and 30 lbf.in$^2$ and an average axial flexural rigidity value between 2 lbf.in$^2$ and 30 lbf.in$^2$. In each of Examples 1-5, the flexural rigidity in the circumferential direction was greater than the flexural rigidity in the axial direction, and the ratio of the flexural rigidity in the circumferential direction to the flexural rigidity in the axial direction was greater than 1:1.

In contrast, Comparative Example 3 (a fiber mesh backing blank) yielded an axial flexural rigidity of 0.62 lbf.in$^2$, a value of only about 25% of the lowest average axial flexural rigidity observed in the Examples. Moreover, for Comparative Example 3, the flexural rigidity in the circumferential direction was less than the flexural rigidity in the axial direction, yielding a ratio of the flexural rigidity in the circumferential direction to the flexural rigidity in the axial direction of less than 1.

Each of the rovings of Examples 1-5 was infused with urethane resin to create a cutting mat backing in accordance with various embodiments herein. The mesh and steel backing blanks of Comparative Examples 1-3 were not infused with urethane. Each backing was then coupled to a cutting surface made of urethane to produce a cutting mat. Each complete cutting mat, including the backings of Comparative Examples 1-3 and Examples 1-5, was installed on a fixed 20.330 inch diameter cylinder and the gap, or curl, was measured on the edge of the cylinder. The results are reported in Table 2.

TABLE 2

| Curl | |
|---|---|
| | Curl (inches) |
| Comparative Example 1 | 0.015 |
| Comparative Example 2 | 0.020 |
| Comparative Example 3 | 0.033 |
| Example 1 | 0.007 |
| Example 2 | 0.010 |
| Example 3 | 0.020 |
| Example 4 | 0.025 |
| Example 5 | 0.032 |

As shown in Table 2, each of Examples 1-5 exhibited less curl than the steel mesh backing (Comparative Example 3), and many of the Examples exhibited less than or equal amounts of curl than the solid steel backing (Comparative Example 2). Examples 1 and 2 exhibited less curl than all of the comparative examples.

Accordingly, various embodiments provide cutting mat backings having increased axial flexural rigidity while controlling the circumferential flexural rigidity. Without being bound by theory, it is believed that increasing the axial flexural rigidity reduces or eliminates the problem of cupping, while controlling the circumferential flexural rigidity reduces or even prevents cutting mats formed from the cutting mat backing from curling when removed from the cylinder to be rotated into another position.

It is noted that terms like "preferably," "conventionally", "commonly," and "typically" are not utilized herein to limit the scope of the claimed disclosure or to imply that certain features are critical, essential, or even important to the structure or function of the claimed invention. Rather, these terms are merely intended to highlight alternative or additional features that may or may not be utilized in a particular embodiment of the present invention.

Unless the meaning is clearly to the contrary, all ranges set forth herein are deemed to be inclusive of all values within the recited range as well as the endpoints.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

What is claimed is:

1. A method of making a cutting mat backing comprising:
creating a roving by wrapping a fiber material around a rotary cylinder under tension to form a plurality of layers, wherein each of the plurality of layers is angled with respect to a central axis of the rotary cylinder and wherein the roving has a normalized axial flexural rigidity of from 2 to 30 lbf.in$^2$ over a beam width of 1 inch and a ratio of normalized circumferential flexural rigidity to normalized axial flexural rigidity of from 1:1 to 30:1;
infusing the roving with a polymer resin; and
curing the resin via electromagnetic radiation to form the cutting mat backing.

2. The method of claim 1, wherein the polymer resin comprises epoxy, polyurethane, polyamide, polyacrylate, polyester, styrene resin, or combinations thereof.

3. The method of claim 1, wherein the polymer resin is applied on the fiber material post-wrapping by hand lamination.

4. The method of claim 1, wherein the polymer resin is cured via ultraviolet light (UV) curing.

5. The method of claim 1, wherein the polymer resin is cured via microwave curing.

6. The method of claim 5, wherein the roving has a difference between the normalized circumferential flexural rigidity and the normalized axial flexural rigidity of from 1 to 21 lbf.in$^2$ over a beam width of 1 inch.

7. The method of claim 1, wherein the normalized circumferential flexural rigidity is from 20 to 30 lbf.in$^2$ over a beam width of 1 inch.

8. The method of claim 1, wherein at least two of the plurality of layers are angled at an angle of from 80 to 89 degrees relative to the central axis of the rotary cylinder.

9. The method of claim 8, wherein the angle is from 84 to 86 degrees relative to the central axis of the rotary cylinder.

10. The method of claim 8, wherein at least two additional of the plurality of layers are angled at an angle of from 45 to 54 degrees relative to the central axis of the rotary cylinder.

11. The method of claim 10, wherein the fiber material comprises carbon fibers, glass fibers, aramid fibers, nylon fibers, polyester fibers, or combinations thereof.

12. The method of claim 1, wherein creating the roving comprises:
wrapping the fiber material around the rotary cylinder under tension to form a first layer and a second layer of the plurality of layers, wherein the first layer and the second layer are angled with respect to the central axis of the rotary cylinder at an angle of 45 to 54 degrees;
wrapping the fiber material around the rotary cylinder under tension to form a third layer and a fourth layer of the plurality of layers, wherein the third layer and the fourth layers are angled with respect to the central axis of the rotary cylinder at an angle of 80 to 89 degrees;
wrapping the fiber material around the rotary cylinder under tension to form a fifth layer and a sixth layer of the plurality of layers, wherein the fifth layer and the sixth layer are angled with respect to the central axis of the rotary cylinder at an angle of 45 to 54 degrees.

13. The method of claim 1, wherein creating the roving comprises:
wrapping the fiber material around the rotary cylinder under tension to form a first layer and a second layer of the plurality of layers, wherein the first layer and the second layer are angled with respect to the central axis of the rotary cylinder at an angle of 80 to 89 degrees;
wrapping the fiber material around the rotary cylinder under tension to form at least a third layer and a fourth layer of the plurality of layers, wherein the third layer and the fourth layers are angled with respect to the central axis of the rotary cylinder at an angle of 45 to 54 degrees.

14. The method of claim 1, wherein the roving has an axial flexural rigidity of from 2.5 to 15 lbf.in$^2$ over a beam width of 1 inch.

15. The method of claim 1, wherein the roving has an axial flexural rigidity of from 2.5 to 5.5 lbf.in$^2$ over a beam width of 1 inch.

16. A method of making a cutting mat backing comprising:
creating a roving by wrapping a plurality of fiberglass strands around a rotary cylinder under tension to form a plurality of layers, wherein each of the plurality of layers is angled with respect to a central axis of the rotary cylinder and wherein the roving has a normalized axial flexural rigidity of from 2 to 30 lbf.in$^2$ over a beam width of 1 inch and a ratio of normalized circumferential flexural rigidity to normalized axial flexural rigidity of from 1:1 to 30:1;
infusing the roving with a polyurethane resin; and
curing the resin using ultraviolet light to form the cutting mat backing.

17. The method of claim 16, wherein the normalized circumferential flexural rigidity is from 20 to 30 lbf.in$^2$ over a beam width of 1 inch.

18. The method of claim 16, wherein a circumferential flexural rigidity of the roving is greater than the axial flexural rigidity of the roving.

19. The method of claim 16, wherein creating the roving comprises:
wrapping the plurality of fiberglass strands around the rotary cylinder under tension to form a first layer and a second layer of the plurality of layers, wherein the first layer and the second layer are angled with respect to the central axis of the rotary cylinder at an angle of 45 to 54 degrees;
wrapping the plurality of fiberglass strands around the rotary cylinder under tension to form a third layer and a fourth layer of the plurality of layers, wherein the third layer and the fourth layers are angled with respect to the central axis of the rotary cylinder at an angle of 80 to 89 degrees;
wrapping the plurality of fiberglass strands around the rotary cylinder under tension to form a fifth layer and a sixth layer of the plurality of layers, wherein the fifth layer and the sixth layer are angled with respect to the central axis of the rotary cylinder at an angle of 45 to 54 degrees.

* * * * *